United States Patent
Ling et al.

(10) Patent No.: US 10,642,648 B2
(45) Date of Patent: May 5, 2020

(54) AUTO-ADAPTIVE SERVERLESS FUNCTION MANAGEMENT

(71) Applicant: Futurewei Technologies, Inc., Plano, TX (US)

(72) Inventors: Wei Ling, San Jose, CA (US); Chen Tian, Union City, CA (US); Ziang Zu, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 95 days.

(21) Appl. No.: 16/054,541

(22) Filed: Aug. 3, 2018

(65) Prior Publication Data

US 2019/0065238 A1  Feb. 28, 2019

Related U.S. Application Data

(60) Provisional application No. 62/549,640, filed on Aug. 24, 2017.

(51) Int. Cl.
  *G06F 9/48* (2006.01)
  *G06F 9/54* (2006.01)
  (Continued)

(52) U.S. Cl.
  CPC .............. *G06F 9/485* (2013.01); *G06F 9/461* (2013.01); *G06F 9/465* (2013.01); *G06F 9/5072* (2013.01);
  (Continued)

(58) Field of Classification Search
  CPC .. G06F 9/4881; G06F 9/542; G06F 2209/548; G06F 9/546
  See application file for complete search history.

(56) References Cited

U.S. PATENT DOCUMENTS

| | | | |
|---|---|---|---|
| 2004/0163089 A1* | 8/2004 | Nishimura | G06F 9/546 719/314 |
| 2012/0102501 A1* | 4/2012 | Waddington | G06F 9/5061 718/105 |

(Continued)

FOREIGN PATENT DOCUMENTS

| | | |
|---|---|---|
| CN | 106462484 A | 2/2017 |
| WO | 2015177056 A1 | 11/2015 |

(Continued)

OTHER PUBLICATIONS

Foreign Communication From a Counterpart Application, PCT Application No. PCT/CN2018/099539, English Translation of International Search Report dated Nov. 1, 2018, 6 pages.

(Continued)

*Primary Examiner* — Dong U Kim
(74) *Attorney, Agent, or Firm* — Conley Rose, P.C.

(57) ABSTRACT

A method implemented by a cloud computing devices comprises removing, by the cloud computing device, data associated with a function from an execution data structure in response to determining that the function is waiting for an input event, adding, by the cloud computing device, a context associated with the function to a management data structure while the function is waiting for the input event, the context associated with the function comprising software components associated with the function and an intermediate variable associated with the function, executing, by the cloud computing device, the function with the input event in response to receiving the input event, and removing, by the cloud computing device, the context associated with the function from the management data structure in response to receiving the input event.

20 Claims, 9 Drawing Sheets

(51) Int. Cl.
G06F 9/50 (2006.01)
G06F 9/46 (2006.01)
(52) U.S. Cl.
CPC .............. G06F 9/542 (2013.01); G06F 9/547 (2013.01); G06F 9/548 (2013.01)

(56) References Cited

U.S. PATENT DOCUMENTS

| | | | |
|---|---|---|---|
| 2015/0234640 A1* | 8/2015 | Tian | G06F 8/451 710/267 |
| 2017/0004017 A1 | 1/2017 | Sandstrom | |
| 2017/0339202 A1 | 11/2017 | Zhou et al. | |
| 2018/0034924 A1* | 2/2018 | Horwood | H04L 67/40 |
| 2018/0336063 A1* | 11/2018 | Nakada | G06F 9/4881 |
| 2018/0375712 A1* | 12/2018 | Krohling | H04L 29/08711 |
| 2019/0004871 A1* | 1/2019 | Sukhomlinov | G06F 9/541 |
| 2019/0012218 A1* | 1/2019 | Rimac | G06F 9/542 |
| 2019/0014171 A1* | 1/2019 | Stein | G06F 9/542 |

FOREIGN PATENT DOCUMENTS

| | | |
|---|---|---|
| WO | 2017048650 A1 | 3/2017 |
| WO | 2017129228 A1 | 8/2017 |

OTHER PUBLICATIONS

Foreign Communication From a Counterpart Application, PCT Application No. PCT/CN2018/099539, English Translation of Written Opinion dated Nov. 1, 2018, 4 pages.
"AWS Step Functions, Build distributed applications using visual workflows," Aug. 2, 2018, 10 pages.
"Cloud Dataflow, Simlified stream and batch data processing, with equal reliability and expressiveness," Aug. 2, 2018, 11 pages.
"Feature Parameter Description," Transmission Resource Management, SRAN5.0, Issue 3, Sep. 30, 2011, 122 pages.
Kablan, M., et al., "Stateless Network Functions: Breaking the Tight Coupling of State and Processing," Proceedings of the 14th USENIX Symposium on Networked Systems Design and Implementation, Mar. 27-29, 2017, 17 pages.
Kablan, M., "Stateless Network Functions," HotMiddleBox, Aug. 17-21, 2015, pp. 49-54.
Zhang, H., et al., "Poseidon: An Efficient Communication Architecture for Distributed Deep Learning on GPU Clusters," Proceedings of the USENIX Annual Technical Conference, Jul. 12-14, 2017, 15 pages.
"3rd Generation Partnership Project; Technical Specification Group Radio Access Network; Evolved Universal Terrestrial Radio Access (E-UTRA); Radio Resource Control (RRC); Protocol Specification (Release 14)," 3GPP TS 36.331, V14.2.2, Technical Specification, Apr. 2017, 721 pages.
Eisenbud, D., et al., "Maglev: A Fast and Reliable Software Network Load Balancer," 13th USENIX Symposium on Networked Systems Design and Implementation, 2016, 13 pages.
Fox, G., et al., "First International Workshop on Serverless Computing," Whitepaper, 2017, 22 pages.
Palkar, S., et al., "E2: A Framework for NFV Applications," SOSP, Oct. 4-7, 2015, 16 pages.
Neves, G., "Keeping Functions Warm—How to Fix AWS Lambda Cold Start Issues," Aug. 2, 2018, 8 pages.
Agha, G., "Actors Programming for the Mobile Cloud," IEEE Computer Society, 13th International Symposium on Parallel and Distributed Computing, 2014, 7 pages.
Schwarzkopf, M., et al., "Omega: flexible, scalable schedulers for large compute clusters," EuroSys, Apr. 15-17, 2013, 14 pages.
Deshpande, N., et al., "Analysis of the Go runtime scheduler," 2012, 8 pages.
Bernstein, P., et al., "Orleans: Distributed Virtual Actors for Programmability and Scalability," Mar. 24, 2014, 13 pages.
"Akka Modules," Version 2.5.14, Aug. 2, 2018, 4 pages.
"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814, V9.0.0, Technical Report, Mar. 2010, 104 pages.
Gember-Jacobson, A., et al., "Improving the Safety, Scalability, and Efficiency of Network Function State Transfers," HotMiddleBox, Aug. 17-21, 2015, 6 pages.
Han, S., et al., "Network Support for Resource Disaggregation in Next-Generation Datacenters," Hotnets, Nov. 21-22, 2013, 7 pages.
Lim, K, et al., "System-level Implications of Disaggregated Memory," 2011, 12 pages.
Wikipedia, "Reactive Streams," Aug. 2, 2018, 4 pages.
Agrawal, K, et al., "Adaptive Scheduling with Parallelism Feedback," PPoPP, Mar. 29-31, 2006, 10 pages.
Baranda, J., et al., "Applying backpressure to balance resource usage in software-defined wireless backhauls," IEEE ICC, 2015, pp. 31-36.
Zhang, I., et al., "Customizable and Extensible Deployment for Mobile/Cloud Applications," Proceedings of the 11th USENIX Symposium on Operating Systems Design and Implementation, Oct. 6-8, 2014, 17 pages.
Rajagopalan, S., et al., "Split/Merge: System Support for Elastic Execution in Virtual Middleboxes," USENIX Association, 10th USENIX Symposium on Networked Systems Design and Implementation, 2013, pp. 227-240.
"Production-Grade Container Orchestration," Aug. 2, 2018, 5 pages.
"Redis," Aug. 2, 2018, 2 pages.
"What is Mesos? A distributed systems kernel," Apache Software Foundation, Aug. 2, 2018, 2 pages.
Isard, M., "Quincy: Fair Scheduling for Distributed Computing Clusters," Oct. 11, 2009, 20 pages.
Wikipedia, "Microservices," Aug. 2, 2018, 8 pages.
Ericcsson, "5G Systems," White Paper, Uen 284 23-3244, Jan. 2015, 14 pages.
Hendrickson, S., et al., "Serverless Computation with OpenLambda," HotCloud, 2016, 7 pages.
Wikipedia, "C-Ran," Aug. 2, 2018, 6 pages.

* cited by examiner

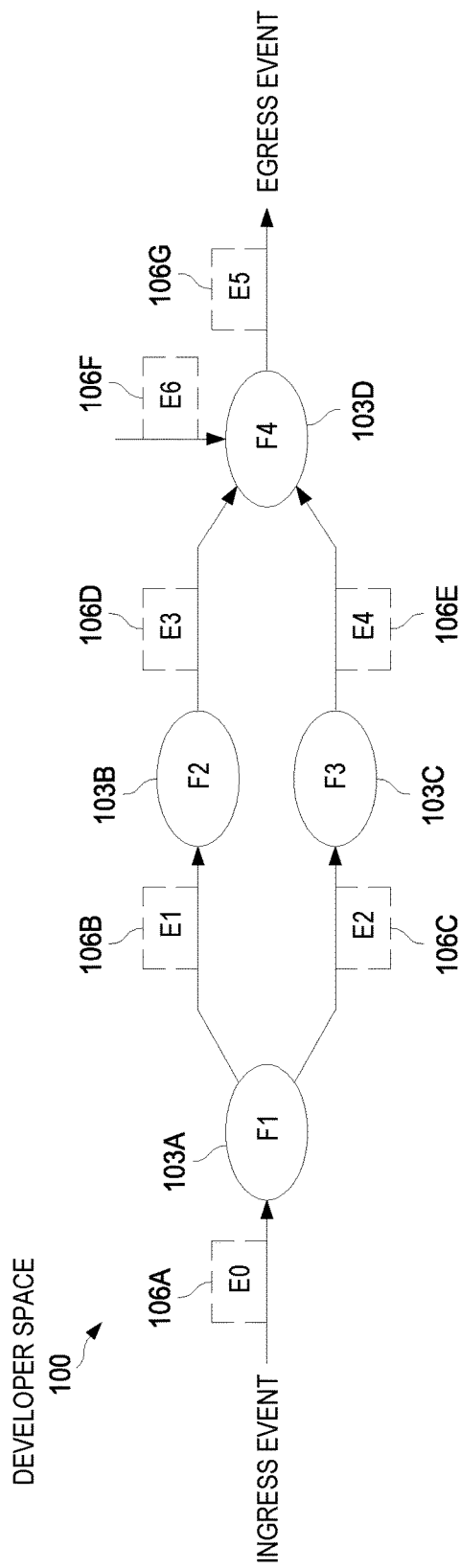

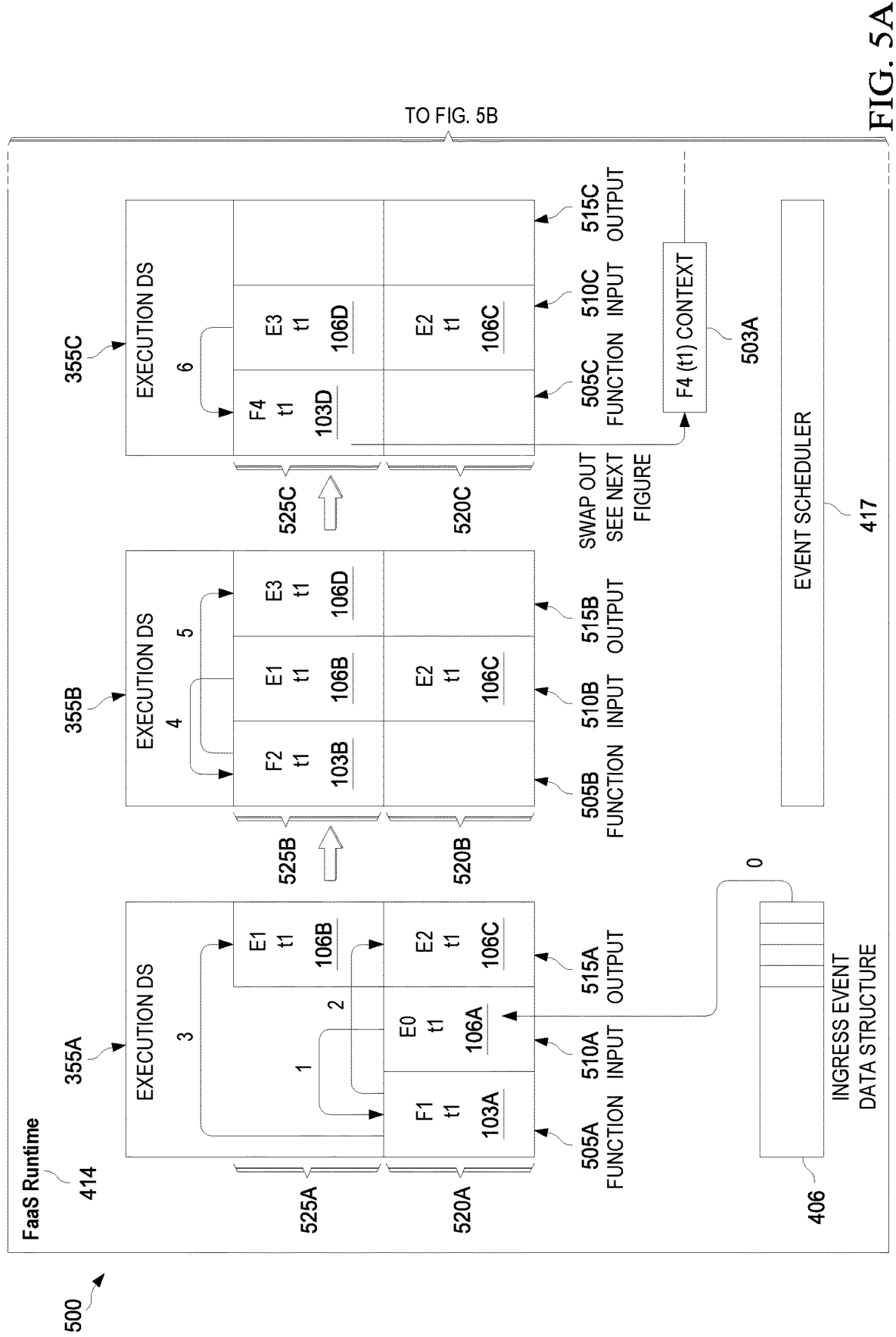

AUTO-ADAPTIVE SERVERLESS FUNCTION MANAGEMENT

CROSS-REFERENCE TO RELATED APPLICATIONS

The present application claims benefit of U.S. Provisional Patent Application No. 62/549,640 filed Aug. 24, 2017, by Wei Ling, et al. and entitled "Autonomous and Adaptive Service Management Method for Stateless and Serverless Framework," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud computing is a model for the delivery of hosted services and functions, which may then be made available to customers through the Internet. Cloud computing enables ubiquitous, convenient, on-demand network access to a shared pool of configurable computing resources that can be provisioned and employed with minimal management effort or service provider interaction. By employing cloud computing resources, providers may deploy and manage emulations of particular computer systems through a network, which provide convenient access to the computing resources.

Function as a service (FaaS) is a category of cloud computing services that provides a platform allowing customers to develop, run, and manage application functionalities without the complexity of building and maintaining the infrastructure typically associated with developing and launching an application. FaaS completely abstracts the servers that are located away from the software developer. In this way, FaaS is the concept of serverless computing via serverless architectures. Software developers can leverage FaaS to deploy an individual function (part of an application), action, or piece of business logic. Cloud computing environments that offer FaaS bill customers based on the consumption and execution of functions, instead of server instance sizes.

SUMMARY

According to one aspect of the present disclosure, there is provided a method implemented by a cloud computing device. The method comprises removing, by the cloud computing device, data associated with a function from an execution data structure in response to determining that the function is waiting for an input event, adding, by the cloud computing device, a context associated with the function to a management data structure while the function is waiting for the input event, the context associated with the function comprising software components associated with the function and an intermediate variable associated with the function, executing, by the cloud computing device, the function with the input event in response to receiving the input event, and removing, by the cloud computing device, the context associated with the function from the management data structure in response to receiving the input event.

Optionally, in any of the preceding aspects, another implementation of the aspect provides that the method further comprises executing, by the cloud computing device, one or more other functions in the execution data structure while the function is waiting for the input event, the execution data structure comprising layers, each layer corresponding to a different one of the other functions.

Optionally, in any of the preceding aspects, another implementation of the aspect provides that the management data structure comprises contexts for a plurality of different functions that are each respectively waiting for an input event.

Optionally, in any of the preceding aspects, another implementation of the aspect provides that the method further comprises storing, by the cloud computing device, a waiting event data structure that maintains a plurality of input events that are each respectively waiting to be received by a corresponding function.

Optionally, in any of the preceding aspects, another implementation of the aspect provides that the method further comprises determining, by the cloud computing device, that the input event has been received based on the input event being in a ready state in the waiting event data structure.

Optionally, in any of the preceding aspects, another implementation of the aspect provides that the function is associated with a first tenant of the cloud computing device, and wherein the input event that is received is associated with the first tenant of the cloud computing device.

Optionally, in any of the preceding aspects, another implementation of the aspect provides that the function is partially executed using a second input event prior to removing the data associated with the function from the execution data structure and while waiting for the input event.

Optionally, in any of the preceding aspects, another implementation of the aspect provides that the intermediate variable is computed in response to partially executing the function.

According to one aspect of the present disclosure, there is provided an apparatus implemented as a computing device. The apparatus comprises memory storage comprising instructions, and one or more processors in communication with the memory storage, the one or more processors being configured to execute the instructions to remove data associated with a function from an execution data structure in response to determining that the function is waiting for an input event, add a context associated with the function to a management data structure while the function is waiting for the input event, the context associated with the function comprising software components associated with the function and an intermediate variable associated with the function, execute the function with the input event in response to receiving the input event, and remove the context associated with the function from the management data structure in response to receiving the input event.

Optionally, in any of the preceding aspects, another implementation of the aspect provides that the software components associated with the function comprise pointers to the software components.

Optionally, in any of the preceding aspects, another implementation of the aspect provides that the execution data structure comprises an entry for the function, an entry for the input event, and an entry for the output event.

Optionally, in any of the preceding aspects, another implementation of the aspect provides that the execution data structure is a stack.

Optionally, in any of the preceding aspects, another implementation of the aspect provides that the one or more processors are further configured to execute the instructions to execute one or more other functions in the execution data structure while the function is waiting for the input event, the execution data structure comprising layers, each layer corresponding to a different one of the other functions.

Optionally, in any of the preceding aspects, another implementation of the aspect provides that the management data structure comprises contexts for a plurality of different functions that are each respectively waiting for an input event.

Optionally, in any of the preceding aspects, another implementation of the aspect provides that the one or more processors are further configured to execute the instructions to store a waiting event data structure that maintains a plurality of input events that are each respectively waiting to be received by a corresponding function.

According to one aspect of the present disclosure, there is provided a non-transitory computer readable medium configured to store a computer program product comprising computer executable instructions that when executed by a processor cause the processor to remove data associated with a function from an execution data structure in response to determining that the function is waiting for an input event, add a context associated with the function to a management data structure while the function is waiting for the input event, the context associated with the function comprising software components associated with the function and an intermediate variable associated with the function, execute the function with the input event in response to receiving the input event, and remove the context associated with the function from the management data structure in response to receiving the input event.

Optionally, in any of the preceding aspects, another implementation of the aspect provides that the computer executable instructions that when executed by the processor further cause the processor to add the data associated with the function back onto the execution data structure before executing the function with the input event.

Optionally, in any of the preceding aspects, another implementation of the aspect provides that the function is partially processed using a second input event prior to removing the data associated with the function from the execution data structure and while waiting for the input event.

Optionally, in any of the preceding aspects, another implementation of the aspect provides that the execution data structure comprises an entry for the function, an entry for the input event, and an entry for the output event.

Optionally, in any of the preceding aspects, another implementation of the aspect provides that the computer executable instructions that when executed by the processor further cause the processor to store a waiting event data structure that maintains a plurality of input events that are each respectively waiting to be received by a corresponding function.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is a diagram of a dataflow graph illustrating a relationship between functions and events at a cloud computing device.

FIG. 2 is a portion of the software code for the execution of a function shown in FIG. 1.

FIGS. 5A-B are diagrams illustrating a method of moving data between the ingress event queue, the execution data structure, the waiting event data structure, and the management data structure to execute the event driven functions according to various embodiments of the disclosure.

DETAILED DESCRIPTION

Figure 3:
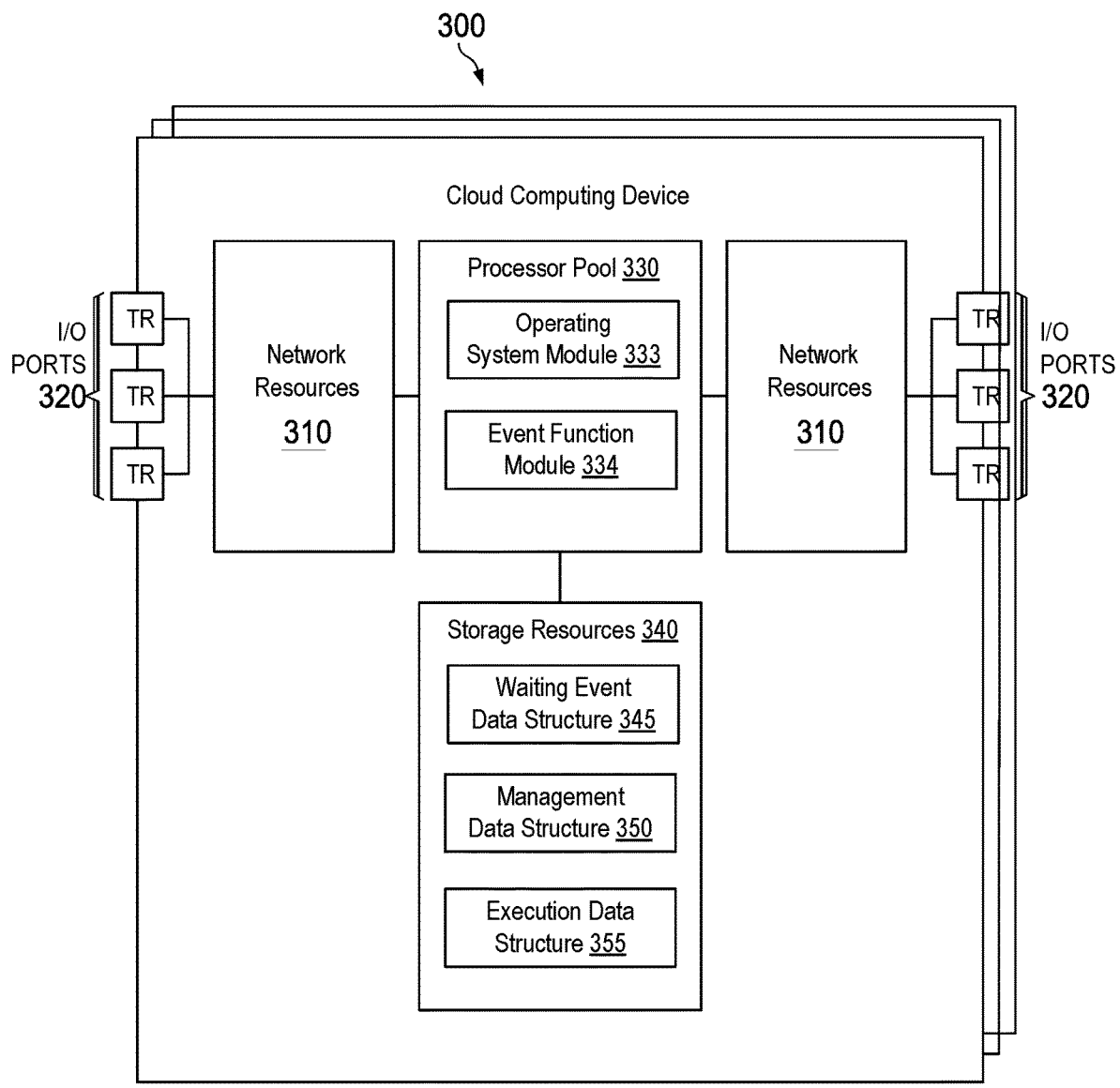
FIG. 3 is a schematic diagram of an embodiment of a cloud computing device according to various embodiments of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

FaaS is a software framework offered by a service provider to software developers. FaaS typically includes a framework of functions that enable applications to seamlessly run across different devices with different types of inputs and outputs and different types of operating systems. In this way, software developers may only need to provide the business logic related to the application being developed, while the FaaS may be used to provide the management logic that ensures that the application may properly execute across various different devices.

FaaS is typically implemented by a cloud computing environment that hosts various service providers, in which the cloud computing environment may include one or more cloud computing devices. The cloud computing environments are typically located remote from the software developer such that the software developer does not need to maintain the hardware and software components necessary to implement the framework provided by the FaaS. Instead, the hardware and software components necessary to implement the framework provided by the FaaS used to implement functions are maintained remotely at the cloud computing environment.

A cloud computing environment (also referred in herein as a cloud computing device) may be a core data center or an edge computing device that pools computing, storage, and network resources to serve multiple clients (users of the application and software developers of the application) that request services from a service provider implemented at the cloud computing environment. A core data center may be a facility used to house the pool of computing, storage, and network resources that provide services to the clients. Core data centers are typically positioned in remote locations such that clients and the core data centers are separated by a large backbone network. Core data centers are typically large facilities that perform industrial scale operations and may use as much electricity as a small town.

In contrast, edge computing devices are miniaturized versions of a core data center that also store a pool of computing, storage, and network resources that may be used to provide cloud services to the same clients. However, the actual size and scale of the resources stored at the edge computing device are much smaller than the size and scale of the resources stored at the core data centers. An example of an edge computing device is a telecommunications edge cloud (TEC) element described in U.S. Patent Pub. No. 2017/0359443, which is hereby incorporated by reference in its entirety.

In both types of cloud computing devices (e.g., the core data centers and the edge computing devices), FaaS may be implemented by executing certain event driven functions in a particular order based on input events that are used by the function to execute. The input events may be data that is received from a user of an application, data received from a remote storage location, or data that is internally computed based on the execution of a function. However, certain functions may not execute until a particular input event is received by the function. This results in a delay of executing one or more functions at the cloud computing device (this delay is also referred to herein as a concurrency issue). Typical cloud computing devices merely wait for the input event to be received before executing the function, thereby delaying the execution of not only the current function, but also delaying the execution of several other functions. However, typical cloud computing devices do not use the serverless framework to deal with the concurrency issue that occurs when a function is waiting for an input event.

Disclosed herein are embodiments directed to managing multiple data structures associated with the execution of event driven functions for one or more applications such that other functions may continue to run while one function is still waiting for an input event. In an embodiment, the cloud computing device may maintain an execution data structure, a management data structure, and a waiting event data structure. The execution data structure includes data associated with the functions that are to be executed, one or more input events for the functions, and one or more output events of the function. The management data structure includes a context associated with the functions that are waiting for one or more input events. The waiting event data structure includes data associated with the input events that functions executed at the cloud computing device are waiting to receive.

In an embodiment, the computing device may be configured to remove, from the execution data structure, data associated with a function that is waiting for an input event in response to determining that the function is still waiting for another input event before the function can execute in full to generate an output event. A context associated with this function that is waiting for the input event may be temporarily added to the management data structure. The context associated with the function may include software components associated with the function and an intermediate variable associated with the function. During the time that the function is waiting for the input event, the computing device may continue to execute other functions that are ready for execution based on the execution data structure. During the time that the function is waiting for the input event, the computing device may also identify when the input event may be ready. The computing device may execute the function when the input event is labelled as ready in the waiting event data structure and then remove the data associated with the function from the management data structure.

In an embodiment, cloud computing devices that are enabled to perform FaaS for software developers are configured with a function runtime that includes the software components necessary to provide basic functions to software developers. For example, the software components for these functions may include any software, such as algorithms, variables, classes, libraries, or objects used to run the functions. Cloud computing devices may also include the hardware components that are used to run the functions, such as, for example, the computing, storage, and network resources discussed above.

The cloud computing device may provide services to two types of clients: a software developer and a tenant. The software developer is responsible for developing, deploying, and executing various functions and applications. The tenants (also referred to herein as users) actually use the functions and applications developed by the software developer.

The cloud device implements serverless computing, which refers to the abstraction of the server management and removes low level infrastructure decisions away from the software developers because the resources are managed by the cloud provider instead of the software developer. For example, when a software developer creates an application, the software developer may only need to develop the actual business logic that is specific to the application. The logic that manages the functions and ensures that the application may seamlessly run across different types of devices with different platforms is provided by the FaaS operations of a cloud computing device. In this way, the software developer is unaware of the hardware and software requirements for executing the functions that are provided by the cloud computing device. Similarly, when a user triggers an application using the cloud computing device, the user is also unaware that the functions of the application are being provided by the cloud computing device instead of a device of the software developer.

FIG. 1 is a diagram of a dataflow graph 100 illustrating a relationship between event driven functions executed at a cloud computing device that implements FaaS. For example, dataflow graph 100 illustrates a relationship between functions 103A-D that are executed at a cloud computing device and events 106A-G that are received or processed at the cloud computing device. While only four functions 103A-D and seven events 106 A-G are shown in FIG. 1, it should be appreciated that any number of functions 103 may be in included in a dataflow graph 100 for an application. FaaS may be used as a framework for developing the functions 103A-D, deploying functions 103A-D, running functions 103A-D, and/or managing a concurrency of the functions 103A-D.

In some cases, the software developer may create the dataflow graph 100 to indicate the input events that may be provided to functions 103A-D and the output events that are generated as a result of executing the functions 103A-D. The functions 103A-D may include some of the FaaS functions that are executed at the cloud computing device on behalf of a user during the execution of an application. The functions 103A-D may also include some of the actual business logic that is implemented during execution of the application that is provided by the software developer. In this way, functions 103A-D may be software code that is executed at the cloud computing device and relates to an algorithm or computation executed for an application.

Events 106A-G are input events or output events for the various functions 103A-D. For example, an event 106A-G may be an input event to one function 103A-D and an output event to another function 103A-D. An input event may be data received from a user of an application, received from a remote state storage, or computed based on the execution of a function 103A-D. For example, an input event may be data received as a result of a user manually entering some data or data received from a remote state storage. An input event may also be an output event received from the execution of a function 103A-D, as will be further discussed below. An output event may be data that is generated as a result of executing the function 103A-D.

As shown in FIG. 1, function F1 103A uses an input event E0 106A. In this case, the input event E0 106A triggers the execution of the function F1 103A using the data from the input event E0 106A. The execution of function F1 103A results in two output events E1 106B and E2 106C.

The output event E1 106B is an input event for function F2 103B. In some cases, the input event E1 106B may trigger the execution of the function F2 103B. The execution of function F2 103B results in an output event E3 106D.

The output event E2 106C is an input event for function F3 103C. The input event E2 106C may trigger the execution of function F3 103C. The execution of function F3 103C results in an output event E4 106E.

The output event E3 106D and the output event E4 106E are input events for function F4 103D. Function F4 103D still needs one more input event E6 106F before function F4 103D may fully execute to product output event E5 106G. The input event E6 106F may be obtained internally, received from a user, or received from a remote state storage.

After receiving the input event 106F, input event E3 106D, and input event E4 106E, the execution of function F4 103D may be triggered. The execution of function F4 103D may result in an on output event E5 106G.

As an illustrative example, suppose that function F4 103D is a function that checks a connection of a cell phone of a user executing an application. Suppose that input event E3 106D and input event E4 106E correspond to some data that is obtained as a result of executing function F2 103B and function F3 103C. However, input event E6 106F corresponds to a tenant identifier that is stored in a remote account database.

In this case, input event E3 106D and input event E4 106E are already ready for processing by function F4 103D. However, since input event E6 106F is still needed for function F4 103D to be fully executed, function F4 103D may include a call to a "Wait" Application Program Interface (API) to wait for the tenant identifier (input event E6 106F) from the remote account database. For example, a function runtime of the cloud computing device may call a user account inquiry to receive account information for the user. After the account information is found in the remote account database, the runtime of the cloud computing device may pull the tenant identifier from the account information. Receiving the tenant identifier (input event E6 106F) may trigger the function F4 103D to further be executed using the tenant identifier (input event E6 106F).

As described above, the cloud computing device may be configured to wait for the input event E6 106F to be received before executing the function F4 103D. This may result in a delay at the execution of not just function F4 103D, but all the functions that execute after function F4 103D and the functions executing on behalf of other tenants. This is because a typical cloud computing device will execute these functions 103A-D in parallel such that each layer is executed immediately upon arrival of an input event. The execution of subsequent functions 103A-D is dependent on the execution of previous functions 103A-D and the successful reception of other input events.

The embodiments disclosed herein are directed to methods and systems that substantially eliminate the concurrency issue that occurs when a function 103A-D is waiting for an input event. In an embodiment, a cloud computing device may include multiple data structures that may be dynamically used to move the order of functions 103A-D around to prevent one function 103 from holding up the execution of other functions 103A-D, as will be further described below.

FIG. 2 is an example of a portion of the software code 200 for the execution of function F4 103D. For example, the software code 200 may include some logic associated with the actual business use of the application, which may be provided by the software developer. The software code 200 for function F4 103D also includes parameters, such an input event number parameter 206 and an input event list 209. The input event number parameter 206 may include a total number of input events used by the function F4 103D to execute in full and generate an output event E5 106G. The input event list 209 includes a list of the input events used by the function F4 103D to execute.

As described above with regard to FIG. 1, function F4 103D may include a call to wait(E6) 212 for an input event E6 106F. However, the software developer typically does not prepare a mechanism to handle the delay that occurs at the cloud computing device as a result of waiting for the input event E6 106F. Similarly, the cloud computing device also does not employ a mechanism by which to compensate for the concurrency issue that occurs when a function F4 103D is waiting for an input event.

In an embodiment, the call to wait(E6) 212 may trigger a swapping out process to be performed at the cloud computing device, which will be further described in detail below with reference to FIGS. 5-7. In an embodiment, the cloud computing device may maintain an execution data structure, a management data structure, and a waiting event data structure. The execution data structure includes data associated with the functions 103A-D that are to be executed, one or more input events for the functions 103, and one or more output events of the functions 103. The management data structure includes a context associated with the functions that are waiting for one or more input events. The context associated with the functions 103A-D may include software components associated with the function and an intermediate variable associated with the function. When a function 103A-D is waiting for an input event, data associated with the function 103A-D may be removed from the execution data structure and added to the management data structure. During this time, other functions 103A-D may be executed without having to also wait for the input event. Upon reception of the input event that function 103A-D is waiting for, the function 103A-D may be removed from the management data structure and executed using the input event.

FIG. 3 is a schematic diagram of an embodiment of a cloud computing device 300 according to various embodiments of the disclosure. As described above, the cloud computing device 300 may refer to a core data center that includes numerous cloud computing devices 300 that are configured to provide the computing, storage, and network resources to software developers and tenants. The cloud computing device 300 may also refer to an edge computing device that provides a cloud computing environment at a customer edge, as opposed to across a backbone network in a remote location (such as the core data center). In this case, the cloud computing device 300 may be similar to the TEC element described in U.S. Patent Pub. No. 2017/0359443, which is already incorporated by reference in its entirety.

The cloud computing device 300 is a compilation of one or more devices or a modular telecom device which integrates networking resources, computing resources, storage resources, operation systems, and various cloud applications into one location. The cloud computing device 300 may be a modified network element, a modified network node, or any other logically/physically centralized networking computing and storage device that is configured to manage the executions of functions 103 based on input events and output events. The cloud computing device 300 may be configured to implement and/or support the telecom cloud system mechanisms and cloud computing mechanisms to provide cloud services, such as FaaS, to software developers. The cloud computing device 300 may be implemented in a single box/chassis or the functionality of the cloud computing device 300 may be implemented in a plurality of interconnected boxes/chassis. The cloud computing device 300 may be any device including a combination of devices (e.g., a modem, a switch, router, bridge, server, client, controller, memory, disks, cache, etc.) that stores cloud computing resources for implementing FaaS, receives business related logic (or software components associated with an application) from a software developer, and manages the various data structures stored at the cloud computing device 300 to handle the concurrency issue that occurs when functions 103 are waiting for input events.

At least some of the features/methods described in the disclosure are implemented in a networking/computing/storage apparatus such as the cloud computing device 300. For instance, the features/methods in the disclosure may be implemented using hardware, firmware, and/or software installed to run on hardware. The cloud computing device 300 is any device that has cloud computing, storage resources, e.g., a memory and a central processing unit (CPU), and networking resources that transports packets through a network, e.g., a switch, router, bridge, server, a client, etc. As shown in FIG. 3, the cloud computing device 300 comprises network resources 310, which may be transmitters, receivers, switches, routers, switching fabric or combinations thereof. In some embodiments, the network resources 310 may comprise a provider edge (PE) router, an optical line terminal (OLT), a broadband network gateway (BNG), wireless access point equipment, and/or an optical transport network (OTN) switch. The network resources 310 are coupled to a plurality of input/output (I/O) ports 320 for transmitting and/or receiving packets or frames from other nodes.

A processor pool 330 is a logical CPU in the cloud computing device 300 that is coupled to the network resources 310 and manages the execution of functions 103 based on input events and output events. The processor pool 330 may comprise one or more multi-core processors and/or memory devices, which may function as data stores, buffers, etc. In one embodiment, the processor pool 330 may be implemented as generic servers and/or virtual memory (VMs).

The processor pool 330 comprises an operating system module 333, which may control and manage the networking, computing, and storage functions of the cloud computing device 300. The processor pool 330 also comprises an event function module 334, which may manage the execution of functions 103A-D (also referred to herein as function 103) at the cloud computing device 300 while minimizing delays that may occur as a result of waiting for input events to be received. As such, the inclusion of the operating system module 333, the event function module 334, and associated methods and systems provide improvements to the functionality of the cloud computing device 300. In an alternative embodiment, the operating system module 333 and the event function module 334 may be implemented as instructions stored in the storage resources 340, which may be executed by the processor pool 330.

The storage resources 340 may comprise a memory, hard disk, and a cache for temporarily storing content, e.g., a random-access memory (RAM). Additionally, the storage resources 340 may comprise a long-term storage for storing content relatively longer, for example, a read-only memory (ROM). For instance, the cache and the long-term storage may include dynamic RAMs (DRAMs), solid-state drives (SSDs), hard disks, or combinations thereof. In an embodiment, the storage resources 340 may store the execution data structure 355, management data structure 350, and the waiting event data structure 345, which will be further described below in more detail with reference to FIGS. 4-7. As should be appreciated, the storage resources 340 may store other types of data and other data structures that are not shown in FIG. 3.

Figure 4:
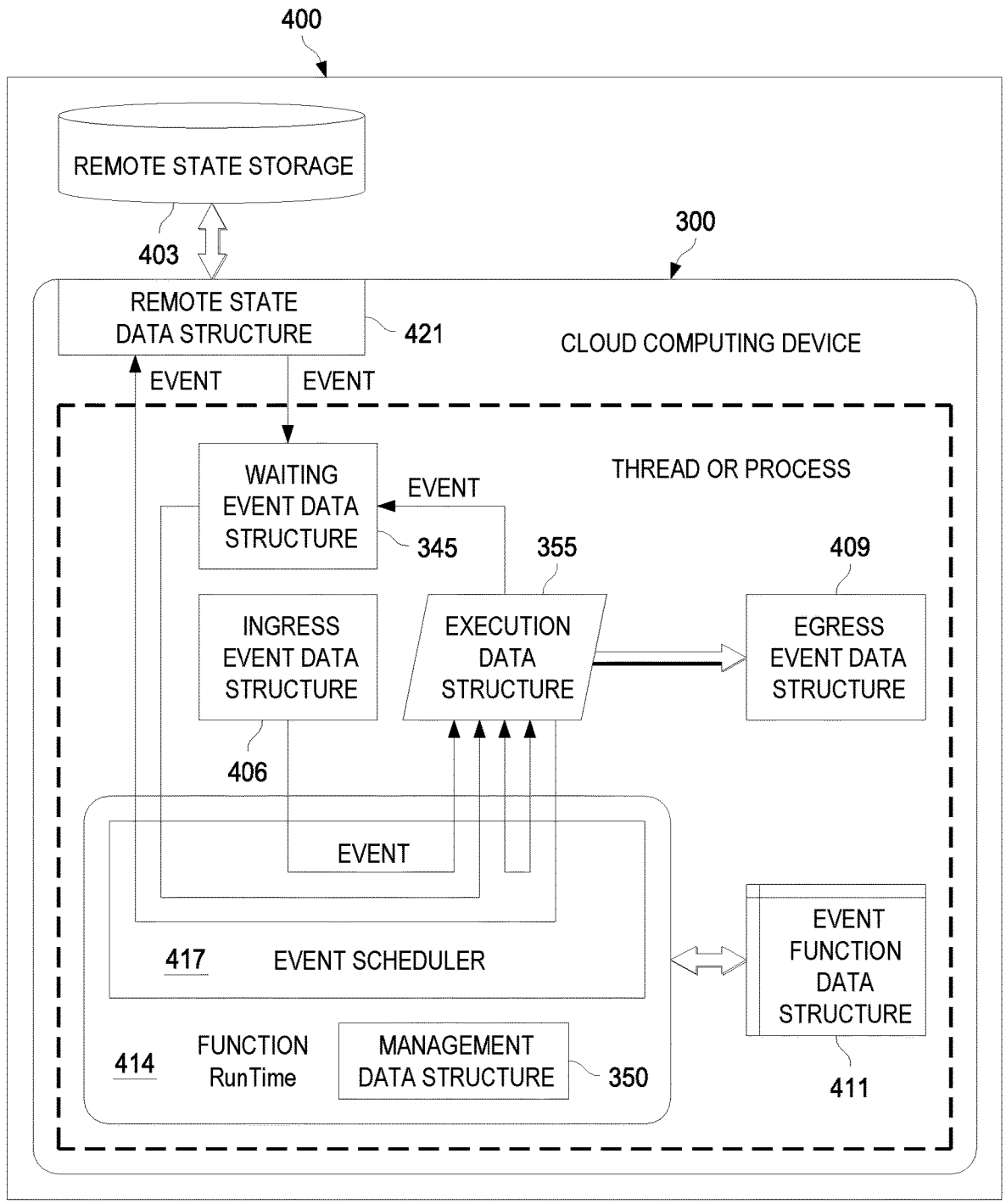
FIG. 4 is diagram illustrating how event driven functions are executed using the cloud computing device and a remote state storage according to various embodiments of the disclosure.

FIG. 4 is diagram 400 illustrating how execute event driven functions 103 that are executed at the cloud computing device 300 according to various embodiments of the disclosure. The cloud computing device 300 may communicate with remote state storage 403, which may be, for example, remote data centers, remote computing devices, remote user devices, remote cloud computing devices 300, or any other remote device by which data may be received by the cloud computing device 300. In some cases, the remote state storage 403 may send data to the cloud computing device 300 that may considered as an input event for a function 103 executing at the cloud computing device 300.

In an embodiment, the cloud computing device 300 may include various data structures that store data regarding a function 103, a corresponding input event, and a corresponding output event for the function 103. For example, as shown in FIG. 4, the cloud computing device 300 may include a waiting event data structure 345, an ingress event data structure 406, an egress event data structure 409, a management data structure 350, an execution data structure 355, and an event function data structure 411. In an embodiment, each of these data structures 345, 406, 409, 350, 355, and 411 is included in the storage resources 340 of the cloud computing device 300. In an embodiment, the processor pool 330 may execute the event function module 334 to change the locations of data within each of these data structures 345, 406, 409, 350, 355, and 411 by removing data from one data structure 345, 406, 409, 350, 355, and 411 and adding the data to another data structure 345, 406, 409, 350, 355, and 411.

In an embodiment, the ingress event data structure 406 is a data structure, such as a queue, that includes the event that first enters the computing device 300 from a network. For example, input event E0 106A may be the only input event stored at the ingress event data structure 406. The intermediate input events E1-E6 are not stored at the ingress event data structure 406. The input events stored at the ingress event data structure 406 may be the actual data associated with the input event or a pointer to the actual data associated with the input event.

In an embodiment, the waiting event data structure 345 is a data structure, such as a queue, that includes data associated with the input events that functions 103 are waiting to receive. For example, the waiting event data structure 345 may include data associated with the input event E6 106F during the time that function F4 103D is waiting for the input event E6 106F. The waiting event data structure 345 may be a queue, and the input events in the waiting event data structure 345 may be processed according to first-in first-out scheme in which input events that are placed into the waiting event data structure 345 first are processed by the cloud computing device 300 first (i.e., used as an input event for executing a function 103).

In an embodiment, waiting event data structure 345 may store a state for each input event, and the state may indicate whether the input event is in a ready state or a pending state. An input event is labelled as being in a ready state when the input event has been computed or received. An input event is labelled as being in a pending state when the input event has not yet been computed or received. In an embodiment, the first input event that is labelled as being in a ready state is processed by the cloud computing device 300.

An egress event data structure 409 may be a data structure, such as a queue, that stores a final output of a dataflow graph, such as that shown in FIG. 1. For example, the egress event data structure 409 may only store output event E5 106G. Similar to the ingress event data structure 406, the egress event data structure 409 also does not store the initial and intermediate events E0-E4 or E6. In some cases, the output events stored at the egress event data structure 409 may be transmitted to a tenant of the cloud computing device 300. In some cases, the output events stored at the egress event data structure 409 may be transmitted back to the ingress event data structure 406 as an input event for another function 103.

An event function data structure 411 may be a data structure that stores directed acyclic graphs (DAGs), dataflow graphs, such as dataflow graph 100, or any other type of graph or data structure that indicates the relationship between one or more input events, a function 103, and one or more output events. In an embodiment, the event function data structure 411 may be stored in the form of a table. In an embodiment, different software developers may develop the DAGs and dataflow graphs that are stored in the event function map 411.

An execution data structure 355 may be a data structure that stores data associated with the functions 103 that are to be executed for an application. The application may be executed at the cloud computing device 300 on behalf of a user requesting execution of the application at a user device. The functions 103 of the application may be processes that are executed at the cloud computing device 300 during execution of the application.

In an embodiment, the execution data structure 355 may be a stack, as will be further described below with reference to FIGS. 5A-B. In an embodiment, the execution data structure 355 may have a plurality of entries and a plurality of layers. For example, the execution data structure 355 may comprise an entry for data associated with input events for a function 103, an entry for data associated with the function 103, and an entry for data associated with the output events of the function 103. For example, the execution data structure 355 may comprise a layer of entries for each function 103 that is to be executed at the cloud computing device 300. In an embodiment, the layer of entries (input events, function 103, and output events) corresponding to a function 103 may be popped off the execution data structure 355 after execution of the function 103 using all of the input events specified by the layer. In an embodiment, the layer of entries corresponding to a function 103 may be popped off the execution data structure 355 in response to determining that the function 103 is waiting for an input event. In this case, data associated with the function 103 may be temporarily added to the management data structure 350, as discussed below.

In an embodiment, the entry for input events may not store the actual data corresponding to the input event, but may instead store a pointer to (or address of) the data corresponding to the input event, where the data corresponding to the input event may be stored elsewhere in the storage resources 340. Similarly, the entry for the function 103 may not store the actual code and software components used to execute the function 103, but may instead store a pointer to the actual code and software components used to execute the function 103. The code and software components used to execute the function may also be stored elsewhere in the storage resources 340 of the cloud computing device 300. Similarly, the entry for the output events may not store the actual data corresponding to the output event, but may instead store a pointer to the data corresponding to the output event, where the data corresponding to the output event may be stored elsewhere in the storage resources 340.

In an embodiment, the management data structure 350 stores data related to the functions 103 that are still waiting for one or more input events before the function 103 may be executed completely to generate an output event. In an embodiment, the management data structure 350 stores the software components for the function 103, such as the code, variables, classes, libraries, objects, algorithms, etc., for the function 103 that is waiting for an input event. In an embodiment, the management data structure 350 may not actually store the software components for the function 103, but may instead store pointers to the software components for the function 103, which may be stored elsewhere in storage resources 340.

In an embodiment, the management data structure 350 may also store the intermediate variables that are generated as a result of partially processing the function 103. An intermediate variable is data that is computed by the function 103 using one or more input events before function 103 begins to wait for other input events to complete processing of the function 103 and generate an output event.

For example, suppose that a function 103 uses two input events to generate an output event, and suppose that only one of the input events have been received. Further, suppose that the received input event, and the function 103 are stored in a layer of the execution data structure 355. The layer of the execution data structure 355 may indicate that the function 103 is still missing an entry for an input event of the function 103. In an embodiment, the function 103 may be partially processed, or partially executed, using the received input event. This partial processing may result in an intermediate variable, which may be variables or data that is computed as a result of partially executing the function 103.

The intermediate variable may be stored at the execution data structure 355. In this way, when the other input events are received, the function 103 may be to restore execution of the function 103 using the remaining input events and the intermediate variable without having to execute the entire function 103 again.

Temporarily saving the intermediate variables for functions 103 that are waiting for input events may save time and resources at the cloud computing device 300 because the cloud computing device 300 does not have to execute the entire function 103 again. Instead, the cloud computing device 300 may use the intermediate variable and the remaining portion of the function 103, which saves time and is a more efficient way of processing functions 103 that are waiting for input events.

The embodiments of the present disclosure also utilizes less memory when performing the swapping out and swapping in process for functions that are waiting to be executed. For example, compared to traditional approaches to handling concurrencies occurring at a cloud computing device 300 that implements FaaS, the function contexts that are swapped out of the execution data structure 355 and into the management data structure 350 are smaller in size.

In an embodiment, the cloud computing device 300 may also include various modules that control each of the data structures 345, 406, 409, 350, 355, and 411 stored at the cloud computing device 300 to execute the functions 103 in an efficient manner. For example, as shown in FIG. 4, the cloud computing device 300 may also include a function runtime 414 and an event scheduler 417.

The function runtime 414 is software that that controls the movement of data across the data structures 345, 406, 409, 350, 355, and 411 stored at the cloud computing device 300 and controls the event scheduler 417. For example, the function runtime 414 performs the swapping in and swapping out process disclosed herein in which a function context is logically moved (redefined) from an execution data structure 355 to a management data structure 350. The function runtime 414 also fetches events from the data structures 345, 406, 409, 350, 355, and 411 and manages the execution data structure 355. As described above, the cloud computing device 300 provides FaaS to subscribing software developers in a manner such that the software developers only need to produce the business logic associated with their application. The software developer may package the business logic including any other data associated with their application and transmit the package to the cloud computing device 300. The cloud computing device 300 may then provide the framework that is needed for the proper execution of the application using the function runtime 414.

An event scheduler 417 may be a software module that is configured to determine which functions 103 to execute and how to assign computing and network resources at the cloud computing device 300 to execute the functions 103. The event scheduler 417 is configured to allow multiple software developers to share the resources at the cloud computing device 300 effectively, keep all computing resources busy (load balancing), achieve a target quality of service, maximize throughput (total amount of processes completed per time unit), minimize wait time (time from a process becoming enabled until the first point that the process begins executing on a resource at the cloud computing device 300), and minimizing latency (time from a process becoming enabled until the time that the process finishes execution).

In an embodiment, the event function module 334 may be a part of the event scheduler 417. In an embodiment, the event function module 334 implements the movement of data across the data structures 345, 406, 409, 350, 355, and 411 in response to certain functions 103 executing or certain functions 103 being labelled as still waiting for input events. In this way, the event scheduler 417 may also be responsible for the movement of data across the data structures 345, 406, 409, 350, 355, and 411 in response to certain functions 103 executing or certain functions 103 being labelled as still waiting for input events.

In an embodiment, the event scheduler 417 may generate the execution data structure 355 based on the event function map 411. The event function data structure 411 indicates which input events are needed for a function 103 and which output events are needed for a function 103. In this way, the event scheduler 417 may determine an order of functions 103 that are to be performed at the cloud computing device 300.

In operation, input events may be obtained (i.e., by either a remote state storage or by the internal processing of another function 103) and stored into a layer of the execution data structure 355. As discussed above, the actual data corresponding to the ingress event data structure 406 may be stored in a memory of the cloud computing device 300, such as in the storage resources 340. The pointer of the data corresponding to the ingress event may be stored at the ingress event data structure 406.

The event scheduler 417 may use the execution data structure 355 to determine which function 103 to execute next based on a layer of the execution data structure 355. In an embodiment, when the layer of the execution data structure 355 indicates that an input event has not yet been received for the function 103 that is next to execute, the event function module 334 may move the data associated with the function 103 that is waiting for an input event to the management data structure 350.

In an embodiment, the function 103 may partially execute using one or more of the input events that have been received, which results in one or more intermediate variables being generated. The intermediate variables are part of the data associated with the function 103 that is moved to the management data structure 350. For example, suppose that the function 103 requires information from the remote state storage 403. In this case, a remote state data structure query 421 may be sent to the remote state storage 403 for the information that is used as an input event for the function 103. During this time, the function 103 may typically be waiting for the input event from the remote state storage 403. Instead of waiting for the input event from the remote state storage 403, the cloud computing device 300 may temporarily move a context including any intermediated variables associated with the function 103 to the management data structure 350.

At this point, the execution data structure 355 may continue the execution of other functions 103 or other functions 103 execution on behalf of other tenants based on the event function map 411 and the execution data structure 355. For example, the execution data structure 355 may include a layer for other functions 103 that includes entries for all the input events that are used to execute the other functions 103. The execution data structure 355 may continue to execute other functions 103 that are not waiting for input events while the function 103 is waiting for input events. In this way, the concurrency or delay that occurs as the result of executing multiple different event driven functions 103 that are dependent on one another is handled.

Figure 5B:
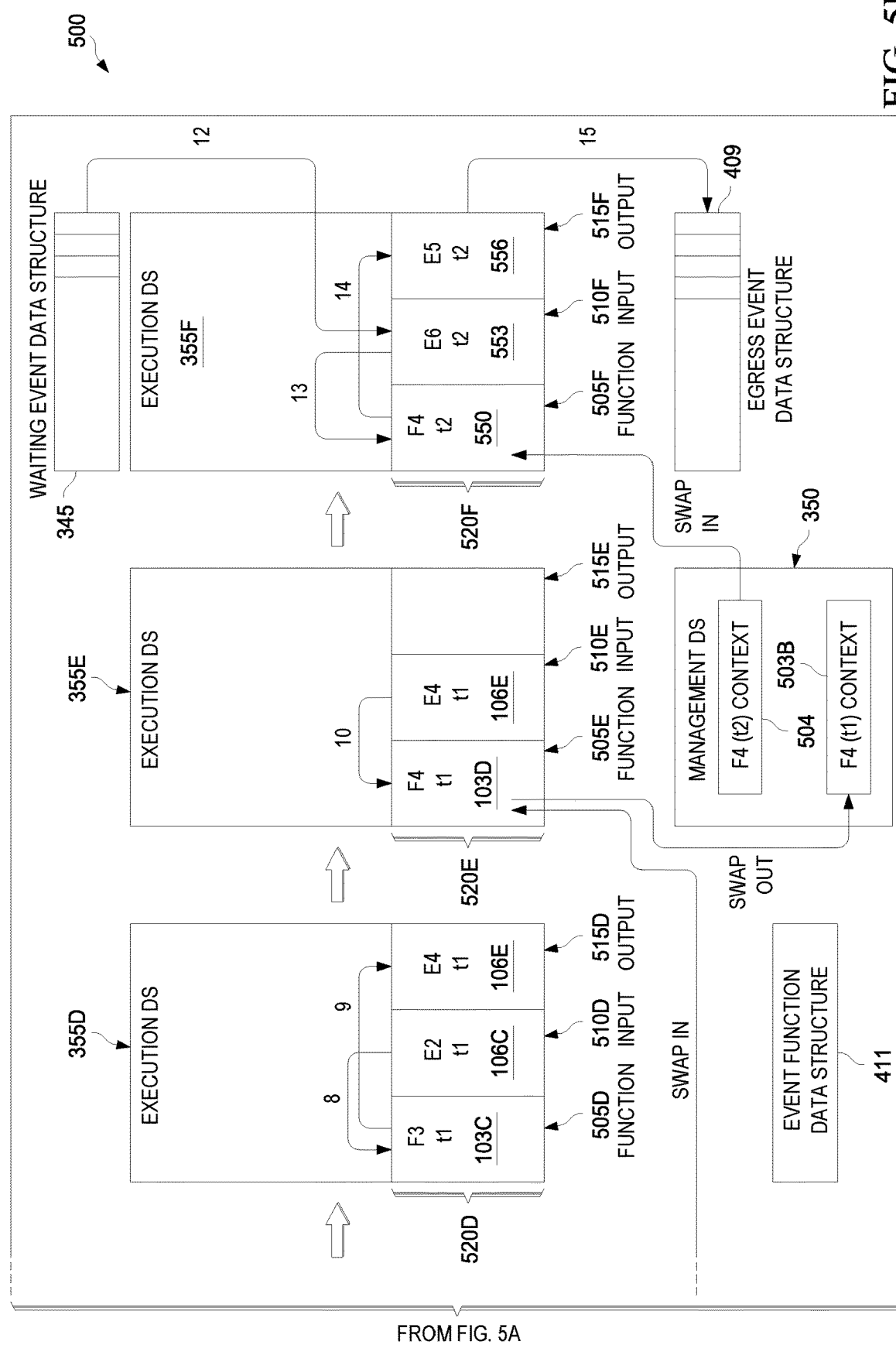

FIGS. 5A-B are diagrams illustrating a method 500 of moving data between the ingress event data structure 406, the execution data structure 355, the waiting event data structure 345, and the management data structure 350 to execute the event driven functions 103 according to various embodiments of the disclosure. In the implementation shown in FIGS. 5A-B, the execution data structure 355A-E is a stack. FIGS. 5A-B shows multiple execution data structures 355A-E, which illustrate various states of the execution data structure 355 over time after the execution of a sequence of functions 103.

Each execution data structure 355A-E includes layers 520 and 525 and entries 505, 510, and 515. The execution data structure 355A includes layers 520A and 525A and entries 505A, 510A, and 515A. Layers 520A and 525A correspond to the execution of a first function F1 103A, which may be invoked by a first tenant, or tenant (t1), as shown in FIGS. 5A-B. Entry 505A includes data associated with the function F1 103A, such the software components or code for F1 103A. Entry 510A includes data corresponding to the input event E0 106A, which may be the actual data corresponding to input event E0 106A or a pointer to the data corresponding to the input event E0 106A. Entry 515A includes data corresponding to the two output events E1 106B and E2 106C produced as a result of executing function F1 103A. The data corresponding to the two output events E1 106B and E2 106C may be the actual data or pointers to the data. Since there are two output events E1 106B and E2 106C for function F1 103A, there are two layers 520A and 525A present in the execution data structure 355A.

In operation, the event scheduler 417 or the function runtime 414 gets the input event E0 106A for a first tenant (t1) from the ingress event queue 406 and places the input event E0 106A into layer 520A and entry 510A of the execution data structure 355A. The event scheduler 417 or the function runtime 414 may determine that function F1 103A corresponds to the input event E0 106A based on the event function data structure 411. The event scheduler 417 or function runtime 414 may add the function F1 103A into layer 520A and entry 505A of the execution data structure 355A. Since function F1 103A only uses input event E0 106A, the event scheduler 417 may execute the function F1 103A, which outputs the output event E2 106C and the output event E1 106B. As shown in FIG. 5A, the output event E1 106B is placed on the top layer 525A of entry 515A while the output event E2 106C is placed on the bottom layer 520A of entry 515A.

In an embodiment, since the output event E1 106B is on the top layer 525A of the execution data structure 355A, the output event E1 106B is first processed to determine a corresponding function F2 103B that uses the output event E1 106B as an input event based on the event function data structure 411. The event scheduler 417 or the function runtime 414 then redefines data associated with output event E1 106B into entry 510B of layer 525B of the execution data structure 355B such that the output event E1 106B becomes an input event E1 106B. The event scheduler 417 or the function runtime 414 then redefines data associated with function F2 103B into the entry 505B and layer 525B of the execution data structure 355B. Since function F2 103B only uses input event E1 106B, the event scheduler 417 may execute the function F2 103B, which outputs the output event E3 106D. As shown in FIG. 5A, the output event E3 106D is placed on the top layer 525B since the top layer 525B of the execution data structure 355B corresponds to function F2 103B.

In an embodiment, since the output event E3 106D is on the top layer 525B of the execution data structure 355B, the output event E3 106D is then processed to determine a corresponding function F4 103D that uses the output event E3 106D as an input event based on the event function data structure 411. The event scheduler 417 or the function runtime 414 then redefines data associated with output event E3 106D in entry 510C of layer 525C of the execution data structure 355C such that the output event E3 106D becomes an input event E3 106D. The event scheduler 417 or the function runtime 414 then adds data associated with function F4 103D in the entry 505C and layer 525C of the execution data structure 355C. As described above with reference to FIG. 1, function F4 103D depends upon three input events E3 106D, E4 106E, and E6 106F. At this point, the execution data structure 355C only includes the data associated with input event E3 106D, and the function F4 103D is still waiting for inputs E4 106E and E6 106F. In an embodiment, the event function module 334 may determine that the function F4 103D is still waiting for additional input events E4 106E and E6 106F to complete execution of F4 103D to generate an output event.

In an embodiment, the event function module 334 may then place input events E4 106E and E6 106F in the waiting event data structure 345, which indicates that a function 103 executing at the cloud computing device 300 for a first tenant (t1) is waiting for input events E4 106E and E6 106F. The event function module 334 may swap out the data associated with function F4 103D from the execution data structure 355C to the management data structure 350. Swapping out the data associated with function F4 103D involve removing the data associated with function F4 103D from layer 525C of the execution data structure 355C and adding context 503A associated with the function F4 103D to the management data structure 350.

In an embodiment, the context 503A associated with the function F4 103D may comprise pointers to the software components associated with the execution of F4 103D and pointers to the input event E3 106D. In an embodiment, the function F4 103D may partially process or execute the function F4 103D using the input event E3 106D to generate one or more intermediate variables that may be subsequently used by function F4 103D after receiving input events E4 106E and E6 106F. In this embodiment, the context 503A associated with the function F4 103 may comprise the intermediate variables.

The execution data structure 355D may be processed after the data associated with function F4 103D has been removed. At this point, the execution data structure 355D only includes layer 520D for input event E2 106C at entry 510D, which was added to the execution data structure 355A during execution of function F1 103A. The input event E2 106C is processed to determine a corresponding function F3 103C that uses the input event E2 106C based on the event function data structure 411. The event scheduler 417 or the function runtime 414 then redefines data associated with function F3 103C into the entry 505D and layer 520D of the execution data structure 355D. Since function F3 103C only uses input event E2 106C, the event scheduler 417 may execute the function F3 103C, which outputs the output event E4 106E. Once function F3 103C has been processed to create the output event E4 106E, the layer 520D with entries 505D, 510D, and 515D for function F3 103C may be removed from the execution data structure 355D.

In an embodiment, the event function module 334 may determine that event E4 106E for the first tenant (t1) is stored at the waiting event data structure 345 as an indication that a function F4 103D is waiting to receive the input event E4 106E. In the event function module 334 may also determine that the management data structure 350 includes the context 503A associated with function F4 103D that is still waiting for additional inputs E4 106E and, later for when the wait API is called, E6 106F.

In this case, the event function module 334 may modify the execution data structure 355E to again include data associated with function F4 103D at entry 505E and layer 520E of execution stack 355E in response to determining that that the management data structure 350 includes the context 503A associated with function F4 103D that is still waiting for additional input E4 106E. The execution data structure 355E may also include the input event E4 106E at entry 510E and layer 520E of the execution stack 355E. In an embodiment, context 503A associated with function F4 103D may be removed from the management data structure 350.

In an embodiment, the function F4 103D may be partially processed, or executed, with the available input event E4 106E and any intermediate variables stored in the context 503A. In this process, additional intermediate variables may be computed based on the partial execution of function F4 103D using input event E4 106E and context 503A. These new intermediate variables may be stored as the context 503B and stored in the management data structure 350 in response to determining that the function F4 103D is still waiting for an additional input event E6 106F. In an embodiment, the context 503B may be similar to context 503A, except that context 503B may include the intermediate variables or pointers to the intermediate variables that are calculated based on the execution of function F4 103D using input events E3 106D and input events E4 106E.

The input event E6 106F may already be placed in the waiting event data structure 345 as indicating that that a function F4 103D executing at the cloud computing device 300 for a first tenant (t1) is waiting for the input event E6 106F. The event function module 334 may again swap out the data associated with function F4 103D from the execution data structure 355E to the management data structure 350. This may involve removing the data associated with function F4 103D from layer 520E of the execution data structure 355E and adding the context 503B associated with the function F4 103D to the management data structure 350.

At this point, layer 520E is removed from the execution data structure 355E, and the execution data structure 355E is empty. The event function module 334 may begin searching for functions 103 that are requested by other tenants other than the first tenant (t1) and input events that have also been provided by other tenants to determine whether other functions may be executed for other tenants. In this way, the cloud computing device 300 continues to execute functions 103 for other tenants while there are functions 103 for tenant (t1) that are waiting for input events.

In an embodiment, the event function module 334 may determine that the waiting event data structure 345 includes an input event E6 553 for a second tenant (t2), which is marked as being in the ready state (i.e., received and stored at the cloud computing device 300). In an embodiment, the event function module 334 may determine that a context 504 associated with function F4 550 for the second tenant (t2) is stored at the management data structure 350, which may indicate some intermediate variables or other data that may be used during execution of the function F4 550. In an embodiment, context 504 associated with the function F4 550 may be removed from the management data structure 350 and data associated with function F4 550 may be added back into the execution data structure 355F at layer 520F and entry 505F. The input event E6 553 for the second tenant (t2) may be retrieved from the ingress event data structure 406 and added to layer 520F and entry 510F of the execution data structure 355F. Function F4 550 may be executed using input event E6 553 for the second tenant (t2) to produce the output event E5 556 for the second tenant (t2). The output event E5 546 may be added to the execution data structure 355F at layer 520F and entry 515F, in case the output event E5 546 may be used as an input event for another function 103.

As described in the example shown in FIGS. 5A-B, the process of swapping out data associated with a function 103 from the execution data structure 355 into the management data structure 350 is performed in response to determining that a function 103 is still waiting to receive an input event. In an embodiment, the process of swapping out data associated with a function 103 from the execution data structure 355 into the management data structure 350 may be performed in response to a Wait( ) API being called during execution of the function 103. For example, the event function module 334 may traverse the code of the function 103 to execute the function 103, and when the event function module 334 identifies a Wait( ) API being called in the code of the function 103, the event function module 334 stores the data associated with the function 103 in the management data structure 350 and removes the data associated with the function 103 from the execution data structure 355.

Figure 6:
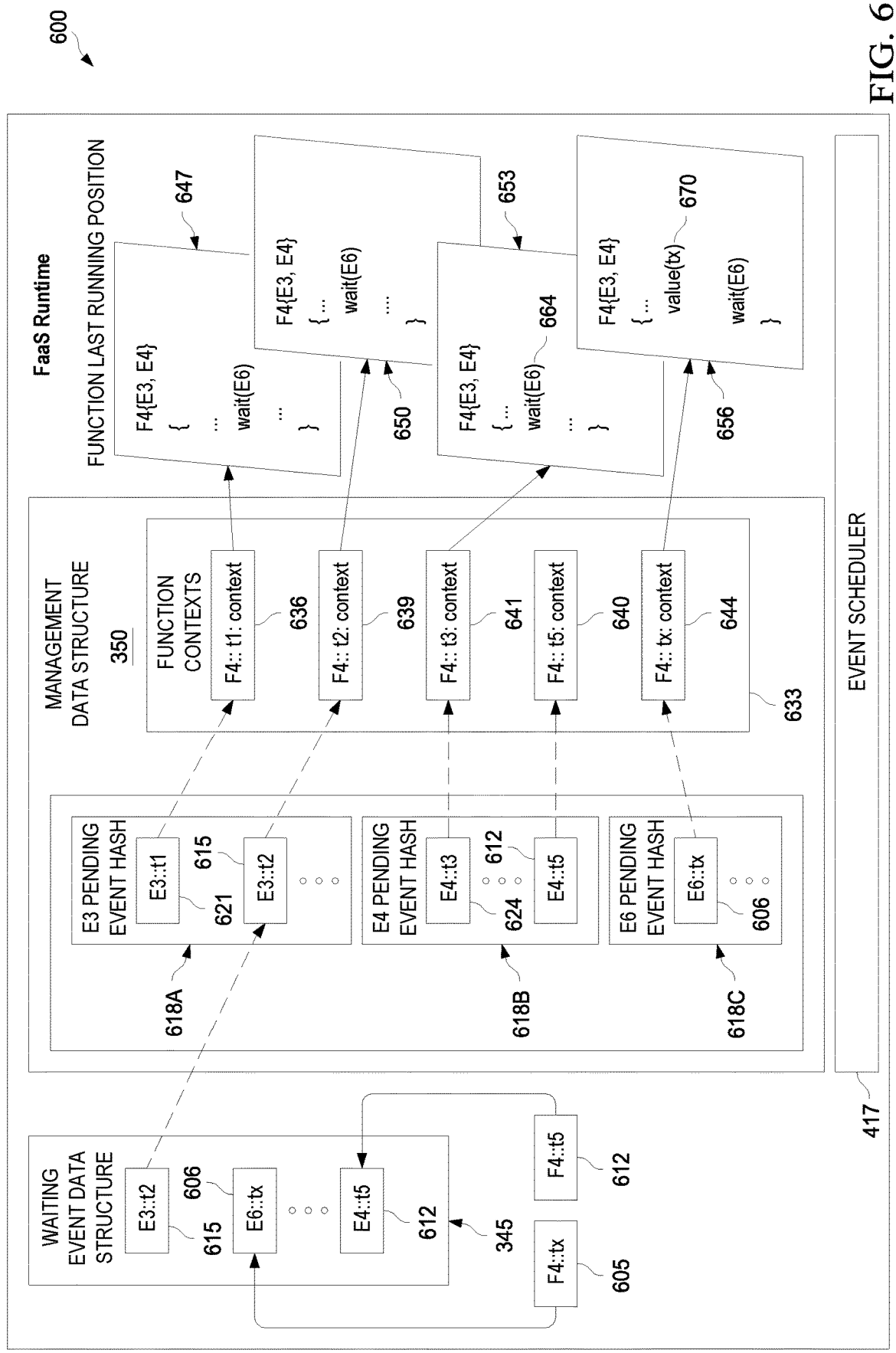
FIG. 6 is diagram illustrating a relationship between the waiting event data structure and the management data structure according to various embodiments of the disclosure.

FIG. 6 is a diagram 600 illustrating a relationship between the waiting event data structure 345 and the management data structure 350. In an embodiment, the waiting event data structure 345 stores data associated with input events 606, 612, and 615 that certain functions 103 are waiting to receive at the cloud computing device 300. In an embodiment, the waiting event data structure 345 may store the actual data that corresponds to each of the input events 606, 612, and 615 at the waiting event data structure 345. In an embodiment, the waiting event data structure 345 may store pointers, or an address of where the actual data that corresponds to each of the input events 606, 612, and 615 is stored at the cloud computing device 300.

In an embodiment, the management data structure 350 stores mappings between the input events 606, 612, 615, 621, and 624 that functions 103 are waiting to receive and function contexts 633 for various tenants using hash tables 618A-C. In an embodiment, each of the input events 606, 612, 615, 621, and 624 are stored in hash tables 618A-C based on the input event 606, 612, 615, 621, and 624. The function contexts 633 store the contexts 636, 639, 640, 641, and 644 (similar to contexts 503A-B and 504 in FIGS. 5A-B) associated with multiple different functions 103 executing on behalf of various tenants. In an embodiment, the management data structure 350 may store the actual contexts 636, 639, 640, 641, and 644 associated with each of the functions 103, such as software components and intermediate variables, at the function contexts 633. In an embodiment, the function contexts 633 may include pointers to the contexts 636, 639, 640, 641, and 644 associated with each of the functions 103.

In addition, FIG. 6 shows examples of different functions F4 103 executing on behalf of different tenants (t1-tx) in boxes 647, 650, 653, and 656, in which there may be any number of functions F4 103 on behalf of any number of tenants (t1-tx). For example, box 647 shows an example of a portion of code that may be included in function F4 103 for tenant (t1), box 650 shows an example of a portion of code that may be included in function F4 103 for tenant (t2), box 653 shows an example of a portion of code that may be included in function F4 103 for tenant (t3), and box 656 shows an example of a portion of code that may be included in function F4 103 for tenant (tx).

As an illustrative example, the waiting event data structure 345 already includes the input event E3 615 for function F4 103 executing on behalf of a tenant (t2), which indicates that function F4 103 executing on behalf of tenant (t2) is waiting for the input event E3 615. Further, suppose that the event scheduler 417 executes function F4 103 on behalf of tenant (t2), which, as shown in box 656, includes a calculation of an intermediate variable 670 for a value (tx) before the call for Wait(E6) at line 667 of the code. For example, the intermediate variable 670 may be a loop count variable in a for-loop that indicates a position at which the for-loop should continue once input event E3 615 has been received.

In an embodiment, the function runtime 414 may determine whether the input event E6 606 is available for being input into the function F4 103 on behalf of tenant (t2). For example, the function runtime 414 may check the ingress event data structure 406 or the states of input events in the waiting event data structure 345 to determine whether the input event E6 606 is available for being input into the function F4 103 on behalf of tenant (t2). If the input event E6 606 is available for being input into the function F4 103 on behalf of tenant (t2), the function runtime 414 redefines the input event E6 606 in the execution data structure 355 for the event scheduler 417 to begin execution of function F4 103 on behalf of tenant (t2). If the input event E6 606 is not available for being input into the function F4 103 on behalf of tenant (t2), the call for Wait(E6) may trigger the swapping out process to occur.

In an embodiment, the swapping out process involves adding input event E6 606 on behalf of tenant (tx) into the waiting event data structure 345, adding data 644 to the function context 633, and removing data associated with function F4 103 on behalf of tenant (t2) from the execution data structure 355. For example, the function event module 334 adds an entry in the waiting event data structure 345 indicating that the function F4 103 executing on behalf of tenant (tx) is waiting for an input event E6 606, which is a pending input event. The function event module 334 further adds context 644 to the function contexts 633 of the management data structure 350, in which the context 644 may include the intermediate variable 670 for value (tx) or a pointer to the intermediate variable 670 for value (tx). The function event module 334 may further delete any data associated with function F4 103 on behalf of tenant (t2) from the execution data structure 355.

Further, suppose that the event scheduler 417 initiates execution function F4 103 on behalf of another tenant (t5), which requires an additional input event E4 612 that has not yet been received or computed. In this case, since function F4 103 on behalf of the tenant (t5) requires another input event, the swapping out process may be triggered for this function F4 103 on behalf of the tenant (t5). The swapping out process may involve adding input event E4 612 on behalf of tenant (t5) into the waiting event data structure 345, adding a context associated with the function F4 103 on behalf of the tenant (t5) to the function contexts 633, and removing data associated with function F4 103 on behalf of the tenant (t5) from the execution data structure 355.

In an embodiment, the management data structure 350 is configured to store mappings between the input events stored at the waiting event data structure 345 and the contexts for each function 103 stored at the function contexts 633. For example, the management data structure 350 stores a plurality of event hash tables 618A-C, where each pending hash table 618A-C stores data for a particular input event from many different tenants. In an embodiment, the event hash tables 618A-C and the function contexts 633 are stored at the management data structure 350.

Event hash table 618A stores data for input events E3 621 and 615, in which input event E3 621 is for tenant (t1) and input event E3 615 is for tenant (t2), and input events E3 621 and 615 may be the same type of input event. Event hash table 618B stores data for input events E4 624 and 612, in which input event E4 624 is for tenant (t3) and input event E4 612 is for tenant (t5), and input events E4 624 and 612 may be the same type of input event. Event hash table 618C stores data for input event E6 606 for tenant (tx). While only three event hash tables 618A-C are shown, it should be appreciated that there may be any number of event hash tables 618 based on any of the input events included the waiting event data structure 345.

Each input event in the event hash table 618A-C may be used as an index to a corresponding context 636, 639, 640, 641, or 644 associated with a function 103 in the function contexts 633. As shown in FIG. 6, the input event E3 621 maps to the context 636 associated with function F4 executed on behalf of tenant (t1), and in this way, the input event E3 621 is the index that maps to the context 636 within the management data structure 350. The input event E3 615 maps to the context 639 associated with function F4 executed on behalf of tenant (t2), and in this way, the input event E3 615 is the index that maps to the context 639 within the management data structure 350. The input event E4 624 maps to the context 641 associated with function F4 executed on behalf of tenant (t3), and in this way, the input event E4 624 is the index that maps to the context 641 within the management data structure 350. The input event E4 612 maps to context 640 associated with function F4 executed on behalf of tenant (t5), and in this way, the input event E4 612 is the index that maps to the context 640 within the management data structure 350. The input event E6 606 maps to the context 644 associated with function F4 executed on behalf of tenant (tx), and in this way, the input event E6 606 is the index that maps to the context 644 within the management data structure 350.

In some embodiments, the management data structure 350 reorganizes the input events in the waiting event data structure 345 into event hash tables 618A-C, which enables the management data structure 350 to be efficiently used by the cloud computing device 300. For example, the cloud computing device 300 may use the mapping mechanism between the waiting event data structure 345 and the function contexts 366 to execute functions 103 at the cloud computing device 300 while minimizing delays occurring during the execution of event driven functions 103.

Figure 7:
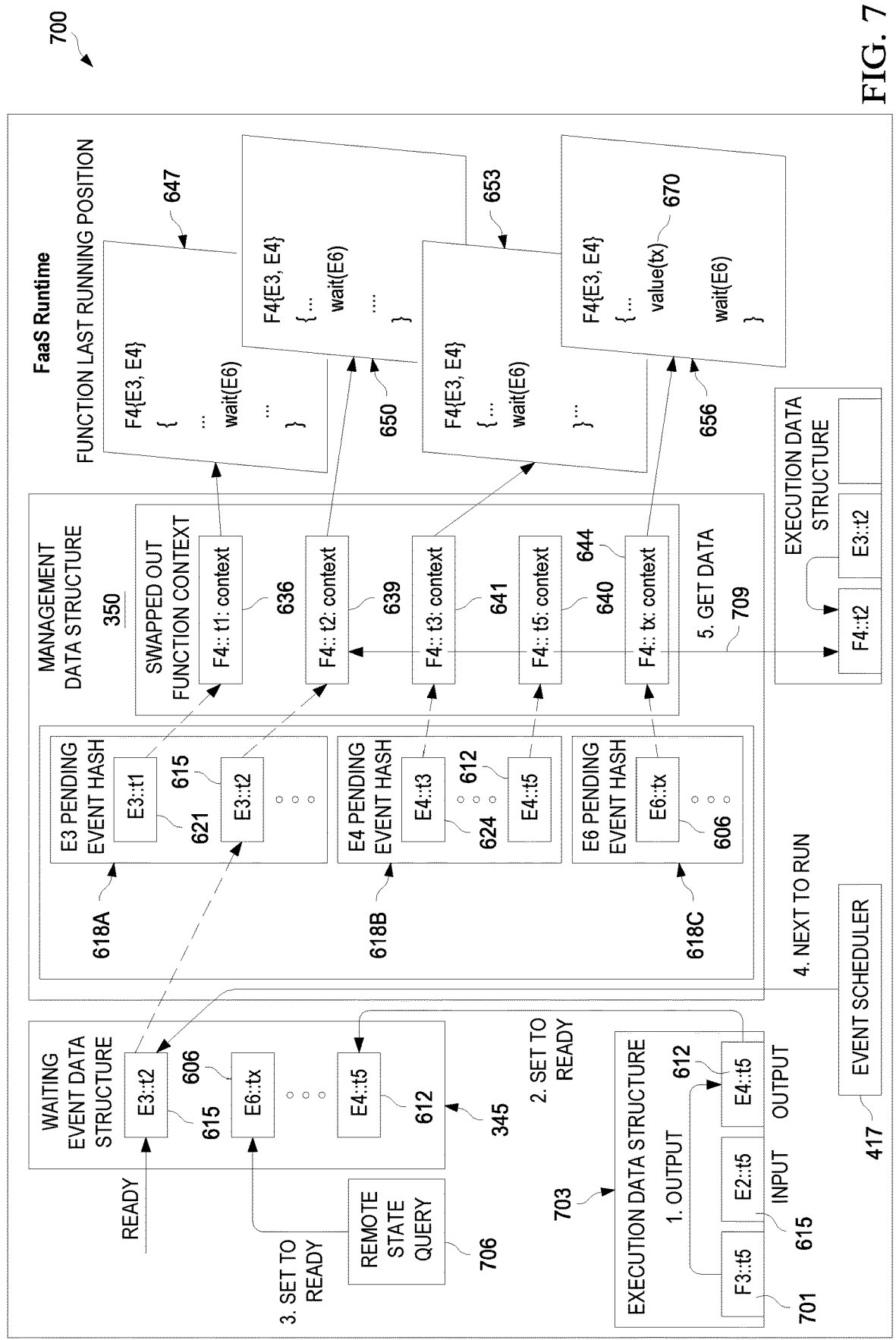
FIG. 7 is a diagram illustrating a method of processing input events from the waiting event data structure according to various embodiments of the disclosure.

FIG. 7 is a diagram illustrating a method 700 of processing input events from the waiting event data structure 345 based on whether the input events are in a ready state or pending state according to various embodiments of the disclosure. Method 700 may be implemented by the processor, which executes the event function module 334, the event scheduler 417, or the function runtime 414 to implement the steps of method 700.

In an embodiment, input events in the waiting event data structure 345 are ordered and processed as a first-in first-out data structure. In an embodiment, each event in the waiting event data structure 345 is labelled as being in a pending state or in a ready state based on whether the input event is ready to be processed by a function 103 or not. An input event is labelled as being in a pending state when the input event has not been obtained from an external remote source or has not been otherwise computed at the cloud computing device 300. An input event is labelled as being in a ready state when the input event has been obtained from an external remote source or has been otherwise computed at the cloud computing device 300. For example, the input events 606, 612, and 615 included in the waiting event data structure 345 may each be labelled as being in a pending state when the respective input event 606, 612, and 615 is initially added to the waiting event data structure 345. Over time, as an input event 606, 612, and 615 is received from an external remote source or is computed internally at the cloud computing device 300 (as being an output event of another function 103), then the input events 606, 612, and 615 are changed to being in a ready state.

In the method 700, suppose that the input event 615 is labelled as being in the ready state in the waiting event data structure 345 and the input events 612 and 615 are labelled as being in the pending state in the waiting event data structure 345. The input events 606, 612, and 615 are processed (provided as inputs to a corresponding function 103) in the order in which the input events 606, 612, and 615 were originally placed into the waiting event data structure 345 and based on whether the input event 606, 612, and 615 is in a ready state or in a pending state.

At step 703, a function F3 701 may be executed on behalf of a tenant (t5) using input event E2 615, which results in the generation of the output event E4 612. The waiting event data structure 345 may be traversed to determine whether an input event E4 612 is included in the waiting event data structure 345. As shown in FIG. 7, input event E4 612 is included in the waiting event data structure 345, and the status of the input event E4 612 may be changed from a pending state to a ready state in response to function F3 703 generating output event E4 612.

At step 706, a response from a remote state query 421 may be received by the computing device 300 in response to transmitting the remote state query 421 to the remote state storage 403 for some data that may be subsequently used as an input event E6 606 on behalf of tenant (tx). Similar to step 703, the waiting event data structure 345 may be traversed to determine whether an input event E6 606 is included in the waiting event data structure 345. As shown in FIG. 7, input event E6 606 is included in the waiting event data structure 345, and the status of the input event E6 606 may be changed from a pending state to a ready state in response to function F3 703 generating output event E4 612.

In an embodiment, the event scheduler 417 may be configured to access the waiting event data structure 345 to fetch an input event in the ready state from the waiting event data structure 345 that was placed into the waiting event data structure 345 first. For example, suppose that input event E3 615 was placed into the waiting event data structure 345 first, input event E6 606 was placed in the waiting event data structure 345 second, and input event E4 612 was placed into the waiting event data structure third. In this case, the input event E3 615 was placed in the waiting event data structure 345 first, and the input event E3 615 gets processed first since the input event E3 615 is in a ready state.

At step 709, the management data structure 350 may determine the function 103 that corresponds to the input event E3 615 based on the function contexts 533. As shown in FIG. 7, function F4 103 corresponds to input event E3 615, executed on behalf of tenant (t2). In an embodiment, the context 639 mapping to input event E4 615 may be swapped back into the execution data structure 355. The swapping of context 639 from the management data structure 350 to the execution data structure 355 involves fetching context 639 from the management data structure 350, and adding context 639 back into the execution data structure 355 according to methods described in FIGS. 5A-B. The execution of function F4 103 on behalf of tenant (t2) may resume using the input event E3 615 based on the context 639 received from the management data structure 350 and the newly ready input event E3 615.

According to various embodiments, the waiting event data structure 345 and the management data structure 350 may control the concurrency of functions 103 executing at the cloud computing device 300. In some cases, a size of the waiting event data structure 345 and a size of the management data structure 350 are proportional to the delay of asynchronous events (e.g., input events that are waiting to be received or waiting based on calls to the wait( ) API). In an embodiment, no other controller or external device needs to be used to implement the event driven function execution mechanisms described herein that minimize delay times that occur between the execution of functions 103. The concurrent processing of events may be adjusting autonomously and may react to delay changes swiftly.

Figure 8:
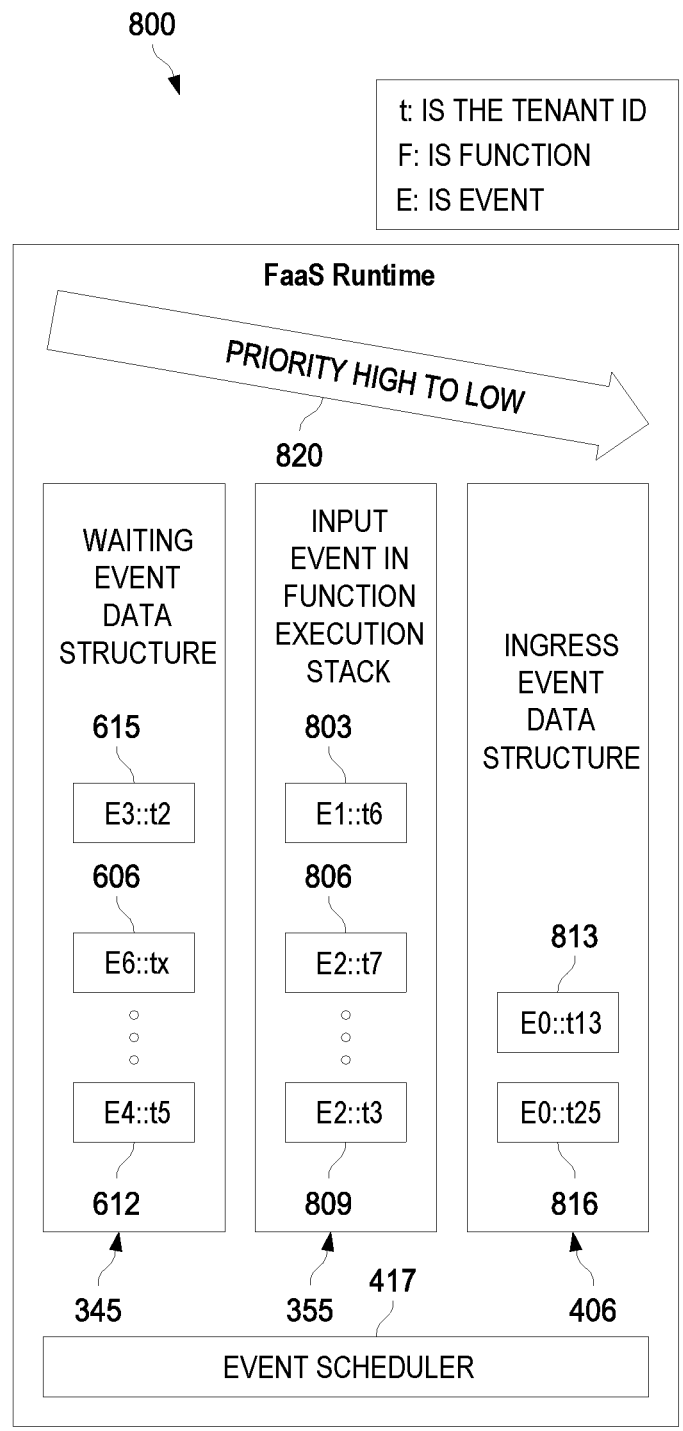
FIG. 8 is a diagram illustrating an execution priority by which functions are executed within the cloud computing device according to various embodiments disclosed herein.

FIG. 8 is a diagram illustrating an execution priority 800 by which functions 103 are executed within the cloud computing device 300 according to various embodiments disclosed herein. The diagram shown in FIG. 8 includes the input events 606, 612, and 615 from the waiting event data structure 345, the input events 803, 806, and 809 in the execution data structure 355, and the input events 813 and 816 in the ingress event data structure 406. While the diagram only shows a limited number of input events in the waiting event data structure 345, execution data structure 355, and ingress event data structure 406, it should be appreciated that any number of input events may be included in the waiting event data structure 345, execution data structure 355, and ingress event data structure 406.

The arrow 820 shown in FIG. 8 shows a direction of the execution priority 800 by which the functions are executed within the cloud computing device 300 by, for example, the event scheduler 417. As shown by arrow 820, the event scheduler 417 may first check the waiting event data structure 345 for input events that are labelled as being in the ready state (e.g., ready for execution by a corresponding function 103). For example, the waiting event data structure 345 may be parsed based on the first-in first-out queue data structure processing scheme to determine the first input event that was placed in the waiting event data structure 345 that is labelled as being in the ready state. When an input event is labelled as being in the ready state, the event scheduler 417 may place the event into the execution data structure 355 for a corresponding function 103 based on the schemes described in FIGS. 5A-B.

As shown by arrow 820, if there is no input event labelled as being in a ready state available at the waiting event data structure 345, the event scheduler 417 may next check the top (remaining) input event in the execution data structure 355 for processing. For example, the event scheduler 417 may periodically check the waiting event data structure 345 for input events that are labelled in a ready state based on a predetermined time interval or between execution of function. When there is no input event labelled as being in a ready state at the waiting event data structure 345, the event scheduler 417 may execute the top most function 103 positioned on the execution data structure 355.

As shown by arrow 820, if there is no input event labelled as being in a ready state available at the waiting event data structure 345 and there is no function 103 or input events available on the execution data structure 355, the event scheduler 417 may retrieve an input event for the ingress event queue 406 for processing. In this way, the event scheduler 417 does not process the input events in the ingress event queue 406 unless no other input events are ready for execution at the waiting event data structure 345 or at the execution data structure 355.

Figure 9:
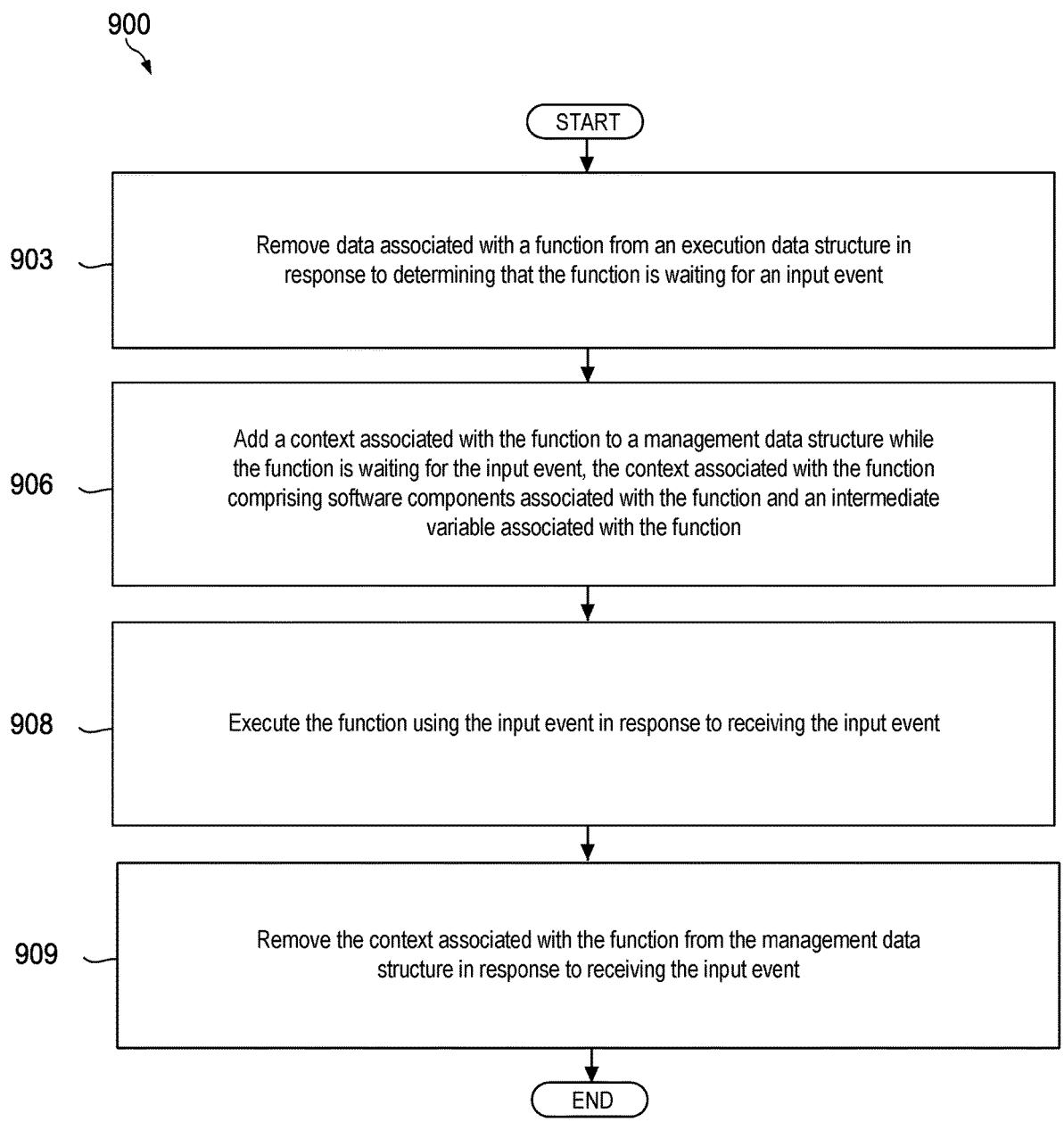
FIG. 9 is a flowchart of a method for implementing the execution of event driven functions according to various embodiments of the disclosure.

FIG. 9 is a flowchart of a method 900 for implementing the execution of event driven functions 103 according to various embodiments of the disclosure. Method 900 may be implemented by a processor pool 330, which executes the event function module 334 to perform method 900. Method 900 may be performed in response to determining that a function 103 is waiting for an input event either based on a Wait( ) call in the function or based on a determination that an input event for the function has not yet been received.

At step 903, data associated with a function 103 is removed from an execution data structure 355 in response to determining that the function 103 is waiting for an input event. The data may be included in layers 520 and 525 of the execution data structure 355. The event function module 334 may be configured to remove data associated with a function 103 from the execution data structure 355.

At step 906, a context associated with the function is added to a management data structure 350 while the function 103 is waiting for the input event. In an embodiment, the context associated with the function 103 comprises software components associated with the function and an intermediate variable associated with the function. In an embodiment, the event function module 334 may be configured to add data associated with a function 103 to the management data structure 350.

At step 908, the function 103 may be executed in response to receiving the input event. For example, the event function module 334 or the event scheduler 417 may execute the function in response to receiving the input event in a manner similar to method 700.

At step 909, the context associated with the function 103 may be removed from the management data structure in response to receiving the input event. In an embodiment, the event function module 334 may be configured to remove the data associated with a function 103 from the management data structure 350.

Embodiments of the present disclosure enable cloud computing devices to operate at a more constant throughput (without experiencing as many delays) when executing event driven functions. Embodiments of the present disclosure also increase the CPU efficiency during delays that occur while executing event driven functions by autonomously adapting to input events based on when the input event is ready. The embodiments disclosed herein do not require a scheduler to adjust the number of waiting function co-routines. Instead, the cloud computing devices instantly auto-adjust the number of waiting function co-routines according to the remote input/output delay, much faster than the periodical adjustment being used in a multiple-thread approach. As a result, a throughput of the cloud computing devices that utilize the embodiments disclosed herein is 30 percent (%) to 60% higher than the throughput of a cloud computing device using a multiple-thread approach. Therefore, the embodiments disclosed herein for executing event driven functions are more efficient than thread scheduling.

In an embodiment, the disclosure includes an apparatus comprising a means for [this will be completed upon completion of the claims.].

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a cloud computing device comprising:
    removing, by the cloud computing device, data associated with a function from an execution data structure in response to determining that the function is waiting for an input event;
    adding, by the cloud computing device, a context associated with the function to a management data structure while the function is waiting for the input event, the context associated with the function comprising software components associated with the function and an intermediate variable associated with the function;
    executing, by the cloud computing device, the function with the input event in response to receiving the input event; and
    removing, by the cloud computing device, the context associated with the function from the management data structure in response to receiving the input event.

2. The method of claim 1, further comprising executing, by the cloud computing device, one or more other functions in the execution data structure while the function is waiting for the input event, the execution data structure comprising layers, each layer corresponding to a different one of the other functions.

3. The method of claim 1, wherein the management data structure comprises contexts for a plurality of different functions that are each respectively waiting for an input event.

4. The method of claim 1, further comprising storing, by the cloud computing device, a waiting event data structure that maintains a plurality of input events that are each respectively waiting to be received by a corresponding function.

5. The method of claim 4, further comprising determining, by the cloud computing device, that the input event has been received based on the input event being in a ready state in the waiting event data structure.

6. The method of claim 1, wherein the function is associated with a first tenant of the cloud computing device, and wherein the input event that is received is associated with the first tenant of the cloud computing device.

7. The method of claim 1, wherein the function is partially executed using a second input event prior to removing the data associated with the function from the execution data structure and while waiting for the input event.

8. The method of claim 7, wherein the intermediate variable is computed in response to partially executing the function.

9. An apparatus implemented as a computing device, comprising:
- memory storage comprising instructions; and
- one or more processors in communication with the memory storage, the one or more processors being configured to execute the instructions to:
  - remove data associated with a function from an execution data structure in response to determining that the function is waiting for an input event;
  - add a context associated with the function to a management data structure while the function is waiting for the input event, the context associated with the function comprising software components associated with the function and an intermediate variable associated with the function;
  - execute the function with the input event in response to receiving the input event; and
  - remove the context associated with the function from the management data structure in response to receiving the input event.

10. The apparatus of claim 9, wherein the software components associated with the function comprise pointers to the software components.

11. The apparatus of claim 9, wherein the execution data structure comprises an entry for the function, an entry for the input event, and an entry for the output event.

12. The apparatus of claim 9, wherein the execution data structure is a stack.

13. The apparatus of claim 9, wherein the one or more processors are further configured to execute the instructions to execute one or more other functions in the execution data structure while the function is waiting for the input event, the execution data structure comprising layers, each layer corresponding to a different one of the other functions.

14. The apparatus of claim 9, wherein the management data structure comprises contexts for a plurality of different functions that are each respectively waiting for an input event.

15. The apparatus of claim 9, wherein the one or more processors are further configured to execute the instructions to store a waiting event data structure that maintains a plurality of input events that are each respectively waiting to be received by a corresponding function.

16. A non-transitory computer readable medium configured to store a computer program product comprising computer executable instructions that when executed by a processor cause the processor to:
- remove data associated with a function from an execution data structure in response to determining that the function is waiting for an input event;
- add a context associated with the function to a management data structure while the function is waiting for the input event, the context associated with the function comprising software components associated with the function and an intermediate variable associated with the function;
- execute the function with the input event in response to receiving the input event; and
- remove the context associated with the function from the management data structure in response to receiving the input event.

17. The non-transitory computer readable medium of claim 16, wherein the computer executable instructions that when executed by the processor further cause the processor to add the data associated with the function back onto the execution data structure before executing the function with the input event.

18. The non-transitory computer readable medium of claim 16, wherein the function is partially processed using a second input event prior to removing the data associated with the function from the execution data structure and while waiting for the input event.

19. The non-transitory computer readable medium of claim 16, wherein the execution data structure comprises an entry for the function, an entry for the input event, and an entry for the output event.

20. The non-transitory computer readable medium of claim 16, wherein the computer executable instructions that when executed by the processor further cause the processor to store a waiting event data structure that maintains a plurality of input events that are each respectively waiting to be received by a corresponding function.

* * * * *